United States Patent
Min et al.

(10) Patent No.: US 9,213,895 B2
(45) Date of Patent: Dec. 15, 2015

(54) IRIS SCANNING APPARATUS EMPLOYING WIDE-ANGLE CAMERA, FOR IDENTIFYING SUBJECT, AND METHOD THEREOF

(75) Inventors: Seung Gi Min, Seoul (KR); Kie Young Lee, Seoul (KR)

(73) Assignee: IRIS ID, Seoul (KR)

( * ) Notice: Subject to any disclaimer, the term of this patent is extended or adjusted under 35 U.S.C. 154(b) by 699 days.

(21) Appl. No.: 13/575,151

(22) PCT Filed: Jan. 27, 2010

(86) PCT No.: PCT/KR2010/000494
§ 371 (c)(1),
(2), (4) Date: Jul. 25, 2012

(87) PCT Pub. No.: WO2011/093538
PCT Pub. Date: Aug. 4, 2011

(65) Prior Publication Data
US 2012/0293629 A1    Nov. 22, 2012

(51) Int. Cl.
*G06K 9/00* (2006.01)

(52) U.S. Cl.
CPC .................................. *G06K 9/00604* (2013.01)

(58) Field of Classification Search
CPC .......................... G06K 9/00604; H04N 13/02
See application file for complete search history.

(56) References Cited

U.S. PATENT DOCUMENTS 6,714,665 B1 *   3/2004   Hanna et al. .................. 382/117
7,130,453 B2 *  10/2006   Kondo ............... G06K 9/00617
                                                    382/117
2001/0028730 A1 * 10/2001  Nahata ............... G06K 9/00604
                                                    382/117
2002/0068995 A1 *  6/2002  Yoshida ................... B25J 9/161
                                                    700/245
2005/0088435 A1 *  4/2005  Geng ..................... G06T 7/0022
                                                    345/419
2008/0297589 A1 * 12/2008  Kurtz ..................... H04N 7/147
                                                    348/14.16
2012/0293629 A1 * 11/2012  Min et al. ........................ 348/46

FOREIGN PATENT DOCUMENTS

| KR | 1020020028406 A | 4/2002 |
| KR | 1020020073653 A | 9/2002 |
| KR | 1020090025647 A | 3/2009 |
| KR | 1020090106792 A | 10/2009 |

OTHER PUBLICATIONS

PCT/KR2010/000494 Intl Search Report dtd Sep. 30, 2010, 3 pgs.

* cited by examiner

*Primary Examiner* — Gregory M Desire
(74) *Attorney, Agent, or Firm* — Loza & Loza, LLP; Heidi Eisenhut (57) ABSTRACT

Embodiments provide an iris scanning apparatus for identifying a subject, employing a wide-angle image collector, and a method thereof. A wide angle camera is employed in the iris scanning apparatus to allow a user to easily locate a small eye region of a subject without having to check back and forth between an image display and the subject's face. The apparatus and method are also capable of measuring the distance to the subject's eye and displaying the distance information on the image display, and informing the user as to whether the eye of the subject is within operating range of the iris scanning apparatus. Also, iris scanning is automatically performed without the user's input when an eye is positioned within operating range, and is not performed if an image captured by the iris scanning apparatus does not contain an eye region, in order to prevent erroneous operation.

19 Claims, 6 Drawing Sheets

IRIS SCANNING APPARATUS EMPLOYING WIDE-ANGLE CAMERA, FOR IDENTIFYING SUBJECT, AND METHOD THEREOF

TECHNICAL FIELD

Embodiments relate to an iris scanning apparatus and method for identifying a subject, and more particularly, to an iris scanning apparatus and method for identifying a subject, that allow a user to easily locate a small eye region of a subject by using a wide angle camera, without having to check back and forth between an image display and the subject's face.

Embodiments also relate to technology that automatically performs iris scanning without a user's input when an eye is positioned within operating range, and does not perform iris scanning if an image captured by the iris scanning apparatus does not contain an eye region, in order to prevent erroneous operation.

BACKGROUND ART

Traditional implements for secure passage such as keys and pass cards offer comparatively low levels of security because they are vulnerable to theft, loss, replication, etc., must always be carried, and sometimes involve having to memorize security numbers. To overcome these drawbacks and offer improvements in security and convenience, much research is underway on personal identification technologies.

One such technology gradually being implemented is bio scan systems that identify each individual person by extracting their uniquely inherent bio data (in fingerprints, face, iris, cornea, hand features, backhand veins, voice, and so forth). Among ways of extracting identifying data by using a camera to capture a biological subject, iris scanning is an individual identification system in wide use today.

An iris scanning apparatus scans the iris of a person entering a facility to determine the identity of that person. Iris scanning systems are being heralded as a promising new security system due to the fact that it is impossible to make reproductions or forgeries of irises. Iris scanning systems are installed on doors, in walls, or separately and are used to determine the identities of entrants.

A specific type of iris scanning apparatus that has been proposed is one that is used to identify third party subjects. An iris scanning apparatus for identifying a subject is one that is used by a user to identify a person other than him/herself—that is, an iris scanning apparatus is used to scan a subject's iris when that person's identity must be determined. The user ensures that the iris scanning apparatus is facing the subject's face, and directly controls the system so that an image collector of the iris scanning apparatus, a camera or image sensor for example, captures the subject's face. In order to use the iris scanning apparatus to scan the subject's iris, the subject's eye must be within the iris scanning range of the iris scanning apparatus.

Related art iris scanning apparatuses for scanning a subject employ a narrow angle image collector that uses a lens with a narrow field of view to capture and furnish a narrow angle image to the user. In order to scan or register the iris of a subject, a user must locate the subject's eye region while observing a captured narrow angle image. During this process, the user cannot observe only the image display, but must look back and forth at the subject's face as well, which is inconvenient.

DISCLOSURE OF INVENTION

Technical Problem

Accordingly, embodiments are directed to an iris scanning apparatus for identifying a subject and a method thereof, that allow a user to locate an eye region of the subject by viewing only an image display.

Embodiments are further directed to an iris scanning apparatus for identifying a subject and a method thereof, that are capable of measuring the distance to the subject's eye and displaying the distance information on an image display, and informing a user as to whether the eye of the subject is within operating range of the iris scanning apparatus.

Technical Solution

In some embodiments, there is provided an iris scanning apparatus for identifying a subject, the apparatus including: a light source for radiating infrared light toward an eye of a subject; a narrow angle image collector for collecting an image of the eye radiated by the light source; a wide angle image collector for collecting an image of an overall face including the eye; an image display for displaying the image collected by the narrow angle image collector and the image collected by the wide angle image collector; and an image processor for determining whether an eye exists in the collected images, and performing, when an eye is determined to exist, iris scanning with the collected image of the eye.

In other embodiments, there is provided an iris scanning method for identifying a subject, the method including: radiating, with a light source, infrared light toward an eye of a subject; collecting, with a narrow angle image collector, an image of the radiated eye; collecting, with a wide angle image collector, an image of an overall face including the radiated eye; displaying the collected images with an image display; determining whether an eye exists in the collected images; and performing, with an image processor, iris scanning using the image collected by the narrow angle image collector, when an eye is determined to exist in the collected images.

Advantageous Effects

With an iris scanning apparatus for identifying a subject according to embodiments, in order to scan a subject's iris, a user does not need to separately observe the subject's face, but can locate the subject's face and perform iris scanning by observing only an image display.

Because information on the distance to a subject's eye is displayed on the image display, a user can easily discern whether the subject's eye is positioned within iris scanning range of the iris scanning apparatus.

Also, according to embodiments, iris scanning or registration may be automatically performed without a user's input when an eye is positioned within iris scanning range, and operation may be prevented for objects other than eyes.

BEST MODE FOR CARRYING OUT THE INVENTION

Embodiments

Hereinafter, embodiments will be described in detail with reference to accompanying drawings.

Figure 1:
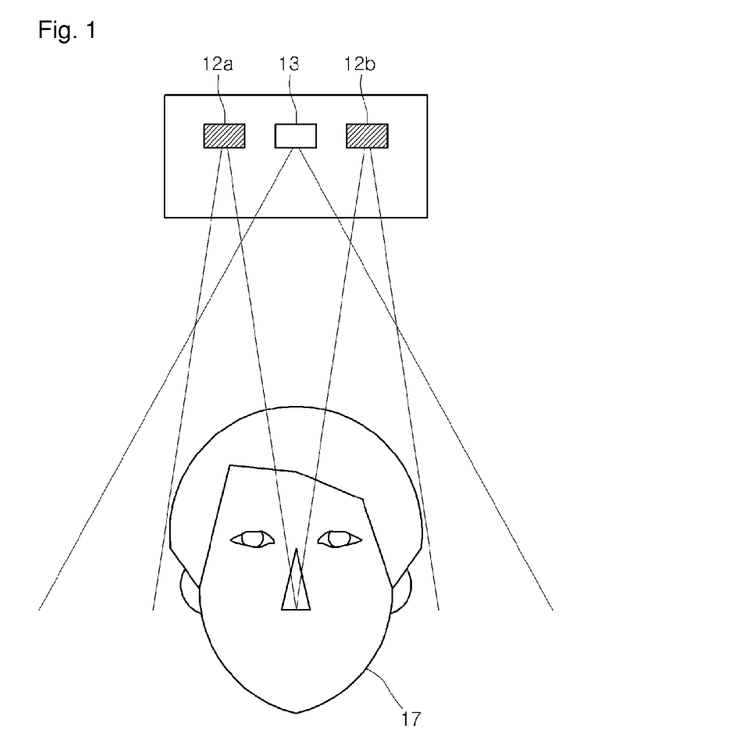
FIG. 1 is a diagram for describing the fields of view of a narrow angle image collector and wide-angle image collector of an iris scanning apparatus for identifying a subject according to an embodiment.

FIG. 1 is a diagram for describing the fields of view of a narrow angle image collector and wide-angle image collector of an iris scanning apparatus for identifying a subject according to an embodiment.

Referring to FIG. 1, an iris scanning apparatus includes narrow angle image collectors 12a and 12b and a wide angle image collector 13 at the front. The narrow angle image collectors 12a and 12b cover only the eye regions of a subject 17, and the wide angle image collector 13 covers the entire face of the subject 17.

Figure 2:
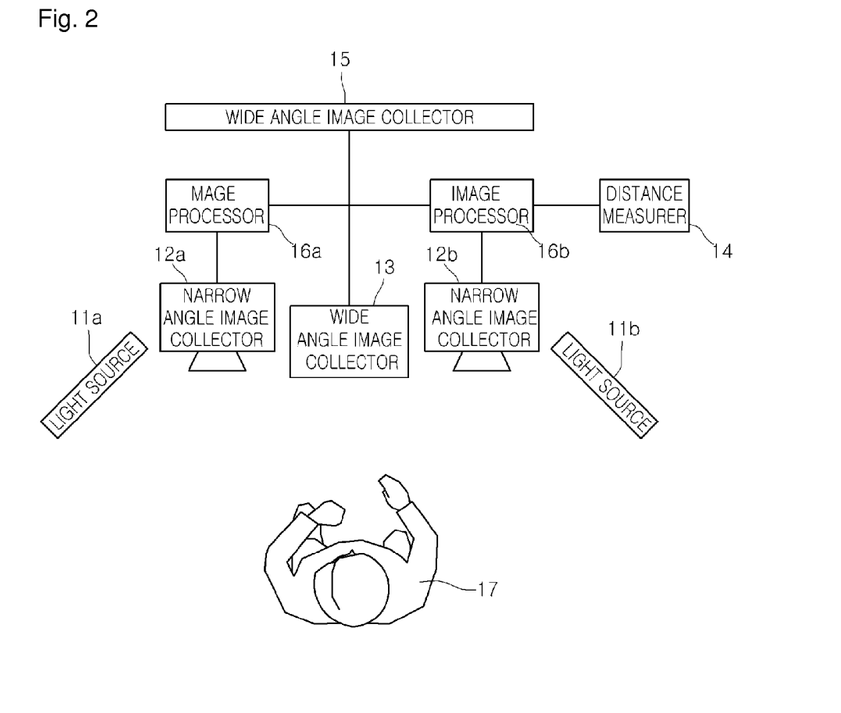
FIG. 2 is a configurative view of an iris scanning apparatus for identifying a subject according to an embodiment.

FIG. 2 is a configurative view of an iris scanning apparatus for identifying a subject according to an embodiment, and is a downward plan view of an iris scanning apparatus for identifying a subject, separated into components.

Referring to FIG. 2, an iris scanning apparatus for identifying a subject according to an embodiment includes light sources 11a and 11b for radiating infrared light toward the eyes of a subject 17, narrow angle image collectors 12a and 12b for collecting an image of eyes radiated by the light sources 11a and 11b, a wide angle image collector 13 for collecting an overall image of a face including the eyes, a distance measurer 14 for measuring the distance to the eyes, an image display 15 for displaying images collected by the narrow angle image collectors 12a and 12b and images collected by the wide angle image collector 13, and image processors 16a and 16b for performing iris scanning with the collected images of eyes.

The user may use the iris scanning apparatus for identifying a subject according to an embodiment to register iris information of the subject 17 in the iris scanning apparatus, or identify the subject 17 with recorded iris information. Thus, in order to perform registration of iris information or iris scanning of the subject 17, the user directs the front surface of the iris scanning apparatus—that is, the surface on which the image collector is disposed—toward the subject's face.

The light sources 11a and 11b radiate infrared light toward the eyes of the subject 17. Preferably, the light sources 11a and 11b may radiate near infrared rays toward the eyes. Also, the light sources 11a and 11b may use a type of light other than infrared light that is most effective at scanning and identifying an iris pattern during registering or scanning of an iris.

The narrow angle image collectors 12a and 12b collect images of the eyes of the subject that are radiated by the light sources 11a and 11b. The narrow angle light collectors 12a and 12b may employ a camera and an image sensor or other devices that can collect images of eyes.

While there are two narrow angle image collectors 12a and 12b shown in FIG. 2, a greater number may be configured in other embodiments. For example, in the case where a stereo camera is used to measure the distance to the eyes in embodiments below, the narrow angle image collectors 12a and 12b may be provided in quadruplicate. Further, when used for iris scanning on only one eye of a subject, the narrow angle image collectors 12a and 12b may be provided singularly.

The narrow angle image collectors 12a and 12b are configured to collect images of an eye region of the subject in a narrow field of view. The eye regions collected by the narrow angle image collectors 12a and 12b are relayed to the image processors 16a and 16b and compared to iris images pre-stored in a storage medium (not shown) to perform iris identification or registration as iris images.

The wide angle image collector 13 collects an image of the entire face of a subject that includes the eyes. The wide angle image collector 13 is configured to capture an image with a wider field of view than the images captured by the narrow angle image collectors 12a and 12b.

While the wide angle image collector 13 in FIG. 2 is provided singularly, it may be provided in plurality in other embodiments in order to cover wider areas. Also, the wide angle image collector 13 may be configured to cover an area greater than just the face of the subject. The wide angle image collector 13 may include the images collected by the narrow angle image collectors 12a and 12b, so that it may determine which body parts of the subject are in the images collected by the narrow angle image collectors 12a and 12b.

For example, when a user first directs the iris scanning apparatus for identifying a subject towards a subject, the narrow angle image collectors 12a and 12b may collect images of the subject's chin, forehead, or of the background, and not of the subject's eyes. In this case, the user may not be able to identify what parts are being captured from only the images collected by the narrow angle image collectors 12a and 12b. Because the wide angle image collector according to embodiments covers an area wider than those covered by the narrow angle image collectors 12a and 12b, however, the user can easily discern through the image collected by the wide angle image collector 13 what regions of the face are being captured by the narrow angle image collectors 12a and 12b.

The wide angle image collector 13, like the narrow angle image collectors 12a and 12b, may employ, in addition to a camera, an image sensor or other device that can collect an image of an eye.

The distance measurer 14 measures the distance to the eye of the subject 17.

According to an embodiment, the narrow angle image collectors 12a and 12b may be employed as a stereo camera, and the distance measurer 14 may match the images collected by the stereo camera to calculate the distance to the eye. Here, the distance to the eye is the distance from the stereo camera to the eye of the subject.

In embodiments, a distance sensor may be used for measuring distance, using ultrasound or a laser. In this case, the distance to the eyes is the distance from where the ultrasonic waves or laser are/is emitted to the position of the subject's eyes. The distance measurer 14 may employ a device other than the stereo camera or the distance sensor for measuring the distance to the eyes.

The image display 15 displays the images collected by the narrow angle image collectors 12a and 12b and the image collected by the wide angle image collector 13. Preferably, the images collected by the narrow angle image collectors 12a and 12b may be parts of the image collected by the wide angle image collector 13 and displayed as such on the image display 15.

The image display 15 may employ an LCD (Liquid Crystal Display), OLED (Organic Light Emitting Diode), or any other type of display device.

Figure 3:
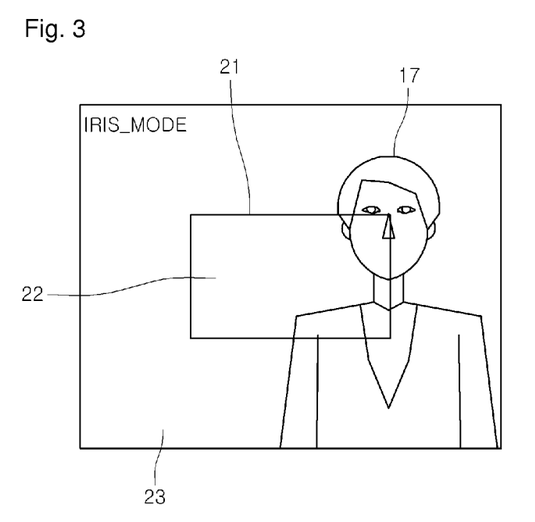
FIG. 3 is an image shown in a first stage on an image display of an iris scanning apparatus for identifying a subject according to an embodiment.

FIG. 3 is an image shown in a first stage on an image display of an iris scanning apparatus for identifying a subject according to an embodiment. In the first stage, a user has directed the iris scanning apparatus toward a subject, and the narrow angle image collectors 12a and 12b are capturing regions other than the eye regions of the subject. The image 22 collected by the narrow angle image collectors 12a and 12b in FIG. 3 is displayed as a portion of the image 23 captured by the wide angle image collector 13 on the image display 15.

According to an embodiment, a narrow angle image indicator 21 allows the image 22 collected by the narrow angle image collectors 12a and 12b to be distinguished from the image 23 collected by the wide angle image collector 13. The narrow angle image indicator 21 indicates the boundary between the images, and aids the user in directing the narrow angle image collectors 12a and 12b toward the eye region of the subject. Accordingly, the user can control the iris scanning apparatus to position the eye region of the subject 17 within the narrow angle indicator 21. The narrow angle indicator 21 may be configured in a shape other than a rectangle.

Figure 4:
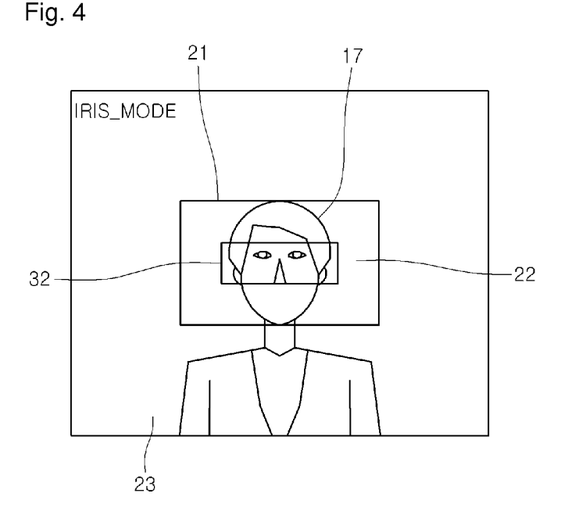
FIG. 4 is an image shown in a second stage on an image display of an iris scanning apparatus for identifying a subject according to an embodiment.

FIG. 4 is an image shown in a second stage on an image display of an iris scanning apparatus for identifying a subject according to an embodiment. In the second stage shown in FIG. 4, while the narrow angle image collectors 12a and 12b are capturing the eye region of the subject 17, the distance between the subject and the iris scanning apparatus is outside the iris scanning range. Therefore, the image processors 16a and 16b are unable to perform iris scanning of the subject 17, and the user may adjust the position of the iris scanning apparatus so that the eye of the subject 17 comes within iris scanning range.

The distance indicator 32 indicates whether the eye is positioned within iris scanning range of the iris scanning apparatus. The distance indicator 32 indicates whether the eye is positioned within iris scanning range of the iris scanning apparatus, using the distance to the eye measured by the distance measurer 14. While the distance indicator 32 may be displayed within the narrow angle image indicator 21 according to an embodiment, it may be displayed outside the narrow angle image indicator 21 in other embodiments. Also, the distance indicator 32 may be formed in an elliptical or other shape instead of a rectangular shape, and may also be embodied as an arrow, etc. in a portion of the image display 15. Further, the distance indicator 32 may be displayed in the form or characters or numbers instead of a shape.

According to an embodiment, the distance indicator 32 may display whether or not the eye is positioned within iris scanning range in mutually different colors. For example, the distance indicator 32 may be displayed in orange when the eye is at a distance greater than the iris scanning range, and in red when the eye is at a distance closer than the iris scanning range.

Figure 5:
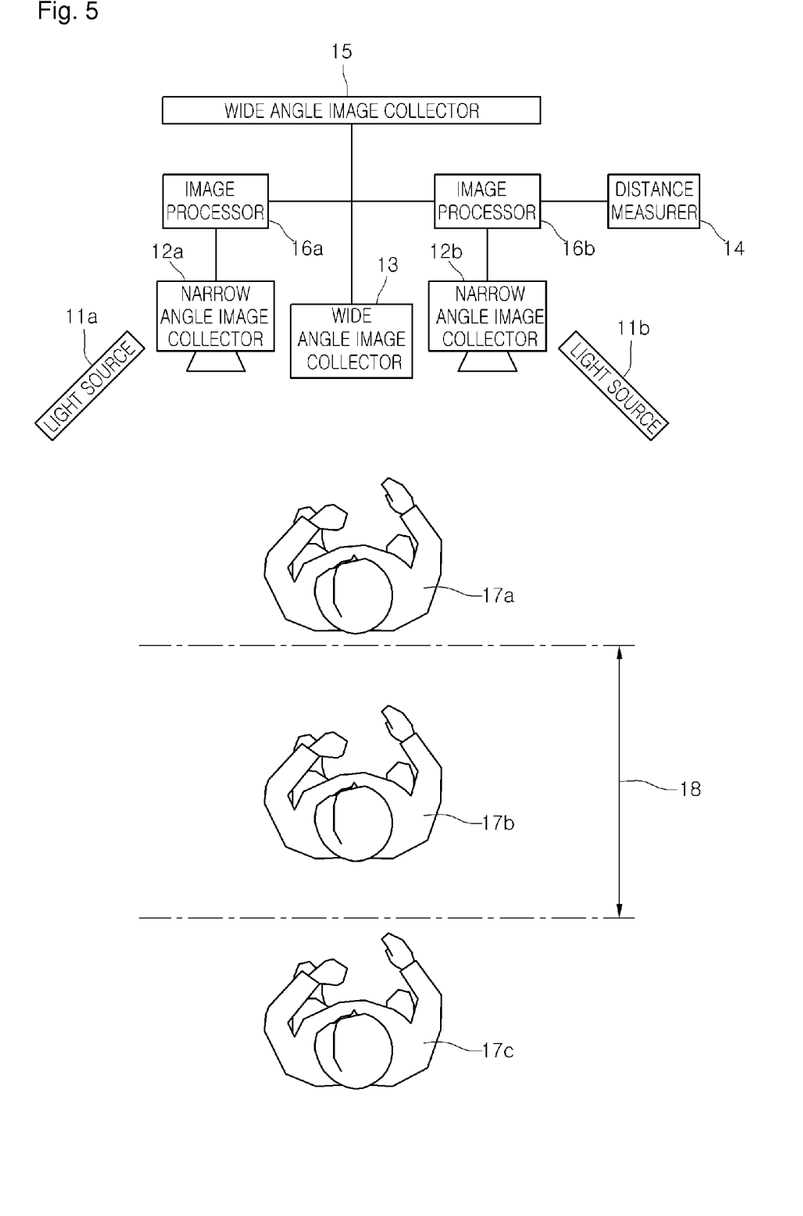
FIG. 5 is a view for describing whether different positions of a subject in the second stage lie within the operating range of an iris scanning apparatus according to an embodiment.

FIG. 5 is a view for describing whether different positions of a subject in the second stage lie within the operating range of an iris scanning apparatus according to an embodiment. In the case 17a where the eye of the subject is at a distance closer than the iris scanning range 18, the distance indicator 32 may be displayed in red. In the case 17c where the eye of the subject is at a distance greater than the iris scanning range 18, the distance indicator 32 may be displayed in orange. According to an embodiment, the size of the distance indicator 32 may shrink as the subject 17 nears the iris scanning apparatus, and conversely, the size of the distance indicator 32 may increase as the subject 17 becomes more distant from the iris scanning apparatus. In this case, when the subject 17 is within the iris scanning range 18, the distance indicator 32 and the narrow angle image indicator 21 may be overlapped.

Figure 6:
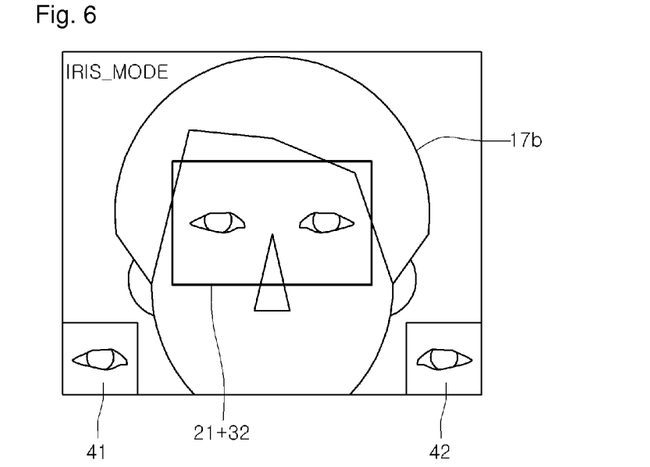
FIG. 6 is an image shown in a third stage on an image display of an iris scanning apparatus for identifying a subject according to an embodiment.

FIG. 6 is an image shown in a third stage on an image display of an iris scanning apparatus for identifying a subject according to an embodiment. In the third stage, a subject 17b is positioned within iris scanning range 18. At this point, the iris scanning apparatus is able to perform iris scanning of the subject. According to an embodiment, the distance indicator 32 may notify the user to begin iris scanning by overlapping with the narrow angle image indicator 21.

According to another embodiment, the image indicator 15 may further display enlarged images of the eyes. FIG. 6 shows enlarged images 41 and 42 of left and right eyes of a subject. According to an embodiment, because resolution varies according to the distance to the eyes, the enlarged images 41 and 42 enable the user to more accurately locate the iris scanning range. That is, even though the subject 17b may be positioned within the iris scanning range, focus of the image may be slightly off, depending on the position of the subject 17b. In this instance, the user may more accurately locate the iris scanning range by observing the enlarged images 41 and 42.

The image processors 16a and 16b perform iris identification through comparing the image of the eye with iris information stored in the storage medium (not shown).

According to another embodiment, the iris scanning apparatus may automatically initiate iris scanning when the eyes are within iris scanning range. Also, the user may directly initiate iris scanning while observing an image as shown in FIG. 6.

According to an embodiment, when a subject is within iris scanning range of an iris scanning apparatus, the apparatus may be configured to perform iris scanning or registration through capturing an image according to a user-issued command such as the pressing of a button, or the apparatus may be configured to perform iris scanning or registration automatically without the input of a user, through capturing an image when a subject comes within iris scanning range. Below, a mode that requires a user action will be referred to as "manual mode", and a mode that performs iris scanning or registration without a user input will be referred to as "automatic mode".

The manual and automatic modes of an iris scanning apparatus may be user-selectable.

In automatic mode, when an object is positioned in front of the image collectors 12a, 12b, and 13 of the iris scanning apparatus and is within operating range, iris scanning or registration is implemented. That is, regardless of whether the object is an eye or not, image capturing is performed in an attempt to scan or register an iris. In manual mode, only when an action such as pressing a button is performed by a user does image capturing occur, so that potential problems that may arise with the former case have little chance of surfacing here. Because an iris scanning apparatus according to embodiments is portable, however, a user may inadvertently press a button to activate the iris scanning function.

According to an embodiment, automatic mode may be configured to analyze an image captured by the narrow angle or wide angle image collectors 12a, 12b, or 13 to determine whether an eye exists in the image, and perform iris scanning or registration only when an eye exists. Manual mode may also be configured so that when an action is input to capture an image, iris scanning or registration may only be performed when an eye exists in a captured image.

Figure 7:
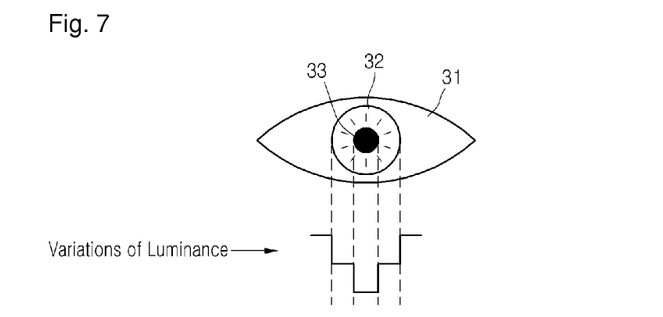
FIGS. 7 and 8 are diagrams showing the determining of whether an eye exists in a collected image, according to embodiments.
Figure 8:
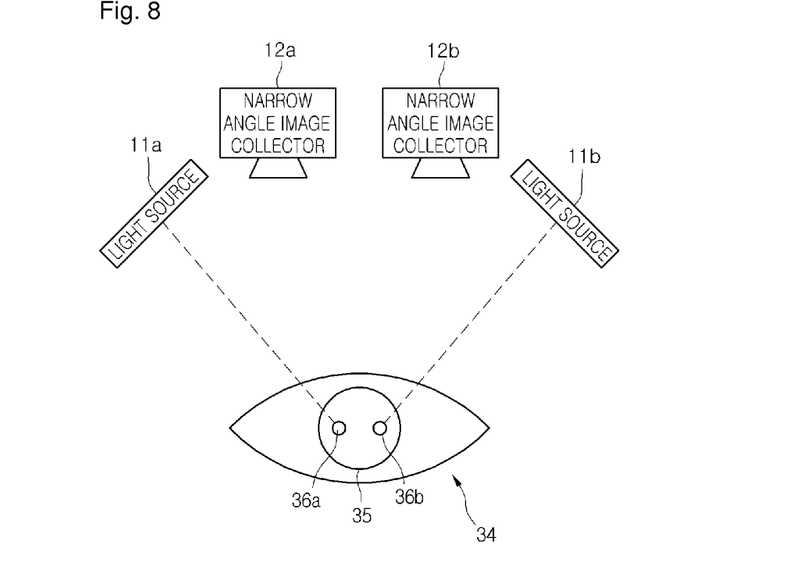

The existence of an eye in a captured image may be determined through the methods shown in FIGS. 7 and 8.

First, FIG. 7 is a method for determining whether there are brightness characteristics in a captured image that are similar to those of an eye.

Referring to FIG. 7, the sclera 31, iris 32, and pupil 33 that compose an eye present a certain brightness contrast. The sclera 31 presents the highest level of brightness, followed by the iris 32, and the pupil 33, which presents the lowest level of brightness. Captured images may be analyzed to determine whether an eye exists by determining if there is a portion that presents a similar brightness contrast to that presented by the sclera, iris, and pupil. While the brightness contrast pattern differs from person to person, an allowable margin of difference and a certain margin of error may be set, so that an eye will be determined to exist if an object presents the brightness contrast pattern as shown in FIG. 7.

FIG. 8 shows a method for determining whether an eye exists by determining if a specular that is characteristic of an eye exists in a captured image.

When the iris scanning apparatus is directed toward a subject's eyes, infrared light forms a specular on the eyes. The iris scanning apparatus determines whether a specular exists in a captured image, to determine whether an eye exists.

Referring to FIG. 8, when an eye 34 is illuminated by 2 light sources 11a and 11b, each of the light sources 11a and 11b forms a specular on the eye 35. A specular 36a formed by the light source 11a is captured by an opposite narrow angle camera 12b, and a specular 36b formed by the light source 11b is captured by an opposite narrow angle camera 12a.

When the existence of speculars 36a and 36b in a captured image is determined thusly, the existence of an eye may also be determined.

According to an embodiment, the method in FIG. 7 or the method in FIG. 8 may selectively be used, or both methods may be used.

According to an embodiment, when iris scanning or registering is performed in automatic mode or manual mode, the typical sound effect of when a photo is captured may be output. When iris scanning is completed, an audio message may be output saying that iris identification is complete, such as "Thank you. You have been identified." When iris registration is completed, a message such as "Eye scanning complete." may be output.

Figure 9:
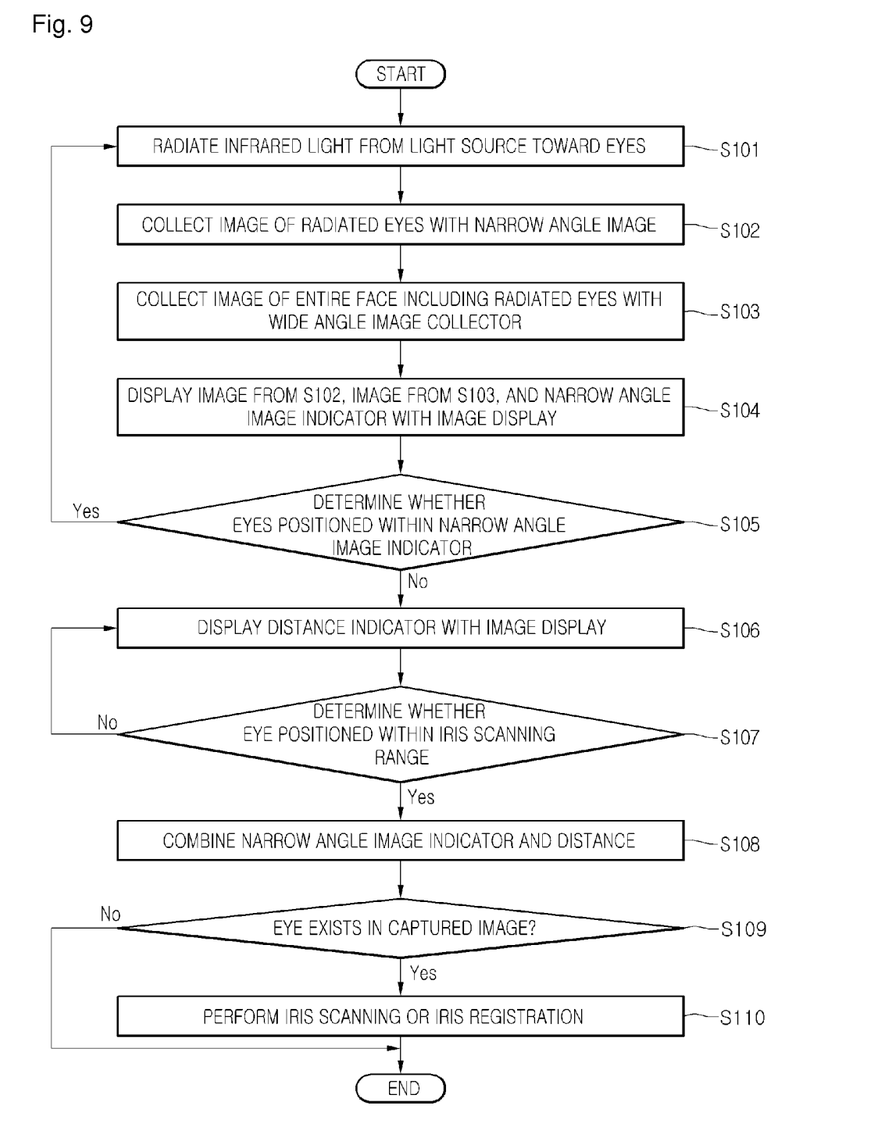
FIG. 9 is a flowchart of an iris scanning method for identifying a subject according to an embodiment.

FIG. 9 is a flowchart of an iris scanning method for identifying a subject according to an embodiment.

Referring to FIG. 9, in operation S101, the light sources 11a and 11b radiate infrared light toward the eyes of a subject 17.

In operation S102, the narrow angle image collectors 12a and 12b collect an image of the eyes of the subject that have been radiated by the light sources 11a and 11b. The image of the eyes collected by the narrow angle image collectors 12a and 12b are relayed to the image processors 14a and 14b and become input data for performing iris scanning.

In operation S103, the wide angle image collector 13 collects an image of the entire face of the subject including the eyes. The wide angle image collector 103, as shown in FIG. 1, is configured to capture a wider image in a greater field of view than the eye image collected by the narrow angle image collectors 12a and 12b. According to another embodiment, the wide angle image collector 13 may collect an image covering more than the face region of the subject. The wide angle image collector 13 collects an image of the overall face of the subject, to enable the determining of which part of the image the narrow image collected by the narrow angle image collectors 12a and 12b is.

In operation S104, the image display 15 displays the image from operation S102, the image from operation S103, and the narrow angle image indicator 21. According to an embodiment, the image collected by the narrow angle image collectors 12a and 12b is included in the image collected by the wide angle image collector 13, and the narrow angle image indicator 21 defines the boundary between the images. Accordingly, the user is able to control the iris scanning apparatus so that the narrow angle image collectors 12a and 12b are able to capture an image of the eye region of the subject.

In operation S105, it is determined whether an eye is disposed within the narrow angle image indicator 21. If it is determined that an eye does not exist within the narrow angle image indicator 21, operation S101 is returned to, and the above operations are repeated.

In operation S106, when it is determined that an eye exists within the narrow angle image indicator 21, the distance indicator 32 is displayed to indicate whether the eye is positioned within the iris scanning range 18 of the iris scanning apparatus, based on the distance to the eye measured by the distance measurer 14. The distance indicator 32 according to an embodiment is displayed within the narrow angle image indicator 21, and displays whether the eye exists or does not exist within the iris scanning range 18 in mutually different colors. For example, if the eye is closer than the iris scanning range 18, red may be displayed, and if the eye is farther, orange may be displayed.

In operation S107, it is determined whether the eye is disposed within the iris scanning range 18. The determining of whether the eye is within the iris scanning range 18 may be made using a method of comparing the distance to the eye measured by the distance measurer 14 to the iris scanning range 18 of the iris scanning apparatus.

In operation S108, when it is determined that the eye is within the iris scanning range 18, the narrow angle image indicator 21 is combined with the distance indicator 32. According to another embodiment, when it is determined that the eye is within iris scanning range, an enlarged image of the eye may be further displayed. According to another embodiment, because the resolution varies according to the distance of the eyes, the enlarged images 41 and 42 enable a user to more accurately locate an iris scanning range. That is, even if a subject 17b is positioned within the iris scanning range, an image may be slightly out of focus according to the position of the subject 17b, in which case, the user may observe the enlarged images 41 and 42 to more accurately locate the iris scanning range.

In operation S109, the image processors 16a and 16b determine whether an eye is included in an image captured by the wide angle image collector or the narrow angle image collectors. The determining of whether an eye is included in a captured image may be made using the methods described with reference to FIGS. 7 and 8.

If an eye is determined to be included, iris scanning or registration is performed in operation S110. Iris scanning or iris registration may be performed through a user input—i.e., in manual mode, or in the absence of a user input when conditions are satisfied—i.e., in automatic mode.

Figure 10:
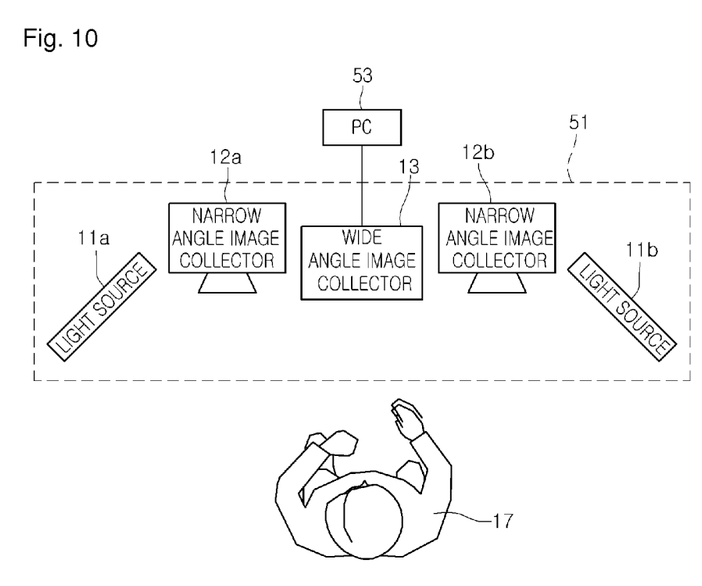
FIG. 10 is a configurative view of an iris scanning apparatus according to an embodiment.

According to an embodiment, an iris scanning apparatus may be constituted of only hardware for iris scanning and registration, and image processing and image displaying may be performed by another device that has a display and processor, such as a desktop PC or laptop, to which the iris scanning apparatus may be connected. FIG. 10 is a configurative view of an iris scanning apparatus according to an embodiment.

As shown in FIG. 10, an iris scanning apparatus 51 may be configured with narrow angle image collectors 12a and 12b, a wide angle image collector 13, and light sources 11a and 11b. The configuration and function of each element is the same as those described with reference to FIG. 2.

Processing and displaying of collected images are performed by a separate processing device—a PC 53, for example. The PC 53 may have software installed for processing the iris scanning apparatus 51 and collected images, and may operate in the same manner as illustrated in FIG. 2.

Because the apparatus shown in FIG. 10 must be connected to a separate processing device, it is not as portable as the apparatus shown in FIG. 2, but manufacturing cost of the iris scanning apparatus 51 may be reduced, and its weight may be reduced.

While the present invention has been described and illustrated herein with reference to preferred embodiments thereof, such description is merely exemplary and does not limit the present invention, and it will be apparent to those having ordinary skill in the art that various modifications and variations can be made therein without departing from the spirit and scope of the invention. For example, each element specifically mentioned in embodiments of the present invention can be modified and worked. Thus, it is intended that the present invention covers the modifications and variations of this invention that come within the scope of the appended claims and their equivalents.

The invention claimed is:

1. An iris scanning apparatus for identifying a subject, the apparatus comprising:
    a light source for radiating infrared light toward an eye of a subject;
    a narrow angle image collector for collecting a narrow image of the eye radiated by the light source;
    a wide angle image collector for collecting a wide image of an overall face including the narrow image;
    an image display for displaying the narrow image collected by the narrow angle image collector and the wide image collected by the wide angle image collector;
    an image processor for determining whether an eye exists in the collected images, and performing, when an eye is determined to exist, iris scanning with the collected image of the eye; and
    a distance measurer for measuring a distance to the eye,
    wherein the narrow angle image collector comprises a stereo camera for collecting the narrow images, and
    wherein the distance measurer match the narrow images collected by the stereo camera to calculate the distance to the eye.

2. The iris scanning apparatus according to claim 1, wherein the image display further displays a distance indicator for indicating whether the eye is positioned within an iris scanning range of the iris scanning apparatus.

3. The iris scanning apparatus according to claim 2, wherein the distance indicator indicates in mutually different colors whether the eye is or is not positioned within the iris scanning range.

4. The iris scanning apparatus according to claim 2, wherein the image display further displays a narrow angle image indicator that distinguishes between the narrow image collected by the narrow angle image collector and the wide image collected by the wide angle image collector.

5. The iris scanning apparatus according to claim 4, wherein when the eye is positioned within the iris scanning range of the iris scanning apparatus, the distance indicator and the narrow angle image indicator are overlapped.

6. The iris scanning apparatus according to claim 5, wherein when the eye is positioned within the iris scanning range of the iris scanning apparatus, the image display further displays an enlarged image of the eye.

7. The iris scanning apparatus according to claim 6, wherein the enlarged image changes in resolution according to the distance to the eye, for obtaining a more accurate iris scanning range.

8. The iris scanning apparatus according to claim 2, wherein when the eye is positioned within the iris scanning range of the iris scanning apparatus, iris scanning is automatically begun.

9. The iris scanning apparatus according to claim 1, wherein the distance measurer includes a distance sensor.

10. The iris scanning apparatus according to claim 1, wherein narrow angle image collector comprises a first narrow angle image collector for collecting one eye and a second narrow angle image collector for collecting the other eye.

11. The iris scanning apparatus according to claim 10, wherein the wide angle image collector is disposed between the first narrow angle image collector and the second narrow angle image collector.

12. An iris scanning method for identifying a subject, the method comprising:
    radiating, with a light source, infrared light toward an eye of a subject;
    collecting, with a narrow angle image collector, a narrow image of the radiated eye;
    collecting, with a wide angle image collector, a wide image of an overall face including the narrow image;
    displaying the collected images with an image display;
    measuring, with a distance measurer, a distance to the eye;
    determining whether an eye exists in the collected images; and
    performing, with an image processor, iris scanning using the image collected by the narrow angle image collector, when an eye is determined to exist in the collected images,
    wherein the narrow angle image collector comprises a stereo camera for collecting the narrow images, and
    wherein the distance measurer match the narrow images collected by the stereo camera to calculate the distance to the eye.

13. The iris scanning method according to claim 12, wherein the displaying of the images comprises displaying a narrow angle image indicator for distinguishing between the narrow image collected by the narrow angle image collector and the wide image collected by the wide angle image collector.

14. The iris scanning method according to claim 13, wherein the displaying of the images further comprises displaying a distance indicator for indicating whether the eye is positioned within an iris scanning range of the iris scanning apparatus, based on the distance to the eye measured by the distance measurer, when the eye is positioned within the narrow angle image indicator.

15. The iris scanning method according to claim 14, wherein the distance indicator displays in mutually different colors whether the eye is or is not positioned within the iris scanning range.

16. The iris scanning method according to claim 14, wherein the displaying of the images further comprises combining the narrow angle image indicator and the distance indicator, when the eye is positioned within the iris scanning range of the iris scanning apparatus.

17. The iris scanning method according to claim 16, wherein the performing of the iris scanning comprises automatically performing iris scanning when the narrow angle image indicator and the distance indicator are combined.

18. The iris scanning method according to claim 14, wherein the displaying of the images further comprises displaying an enlarged image of the eye, when the eye is positioned within the iris scanning range of the iris scanning apparatus.

19. The iris scanning method according to claim 18, wherein the enlarged image changes in resolution according to the distance to the eye, for obtaining a more accurate scanning range.

* * * * *